June 16, 1931.  A. G. FORD  1,809,930
AUTOMATIC GAS GOVERNOR LOADER
Filed Dec. 16, 1926
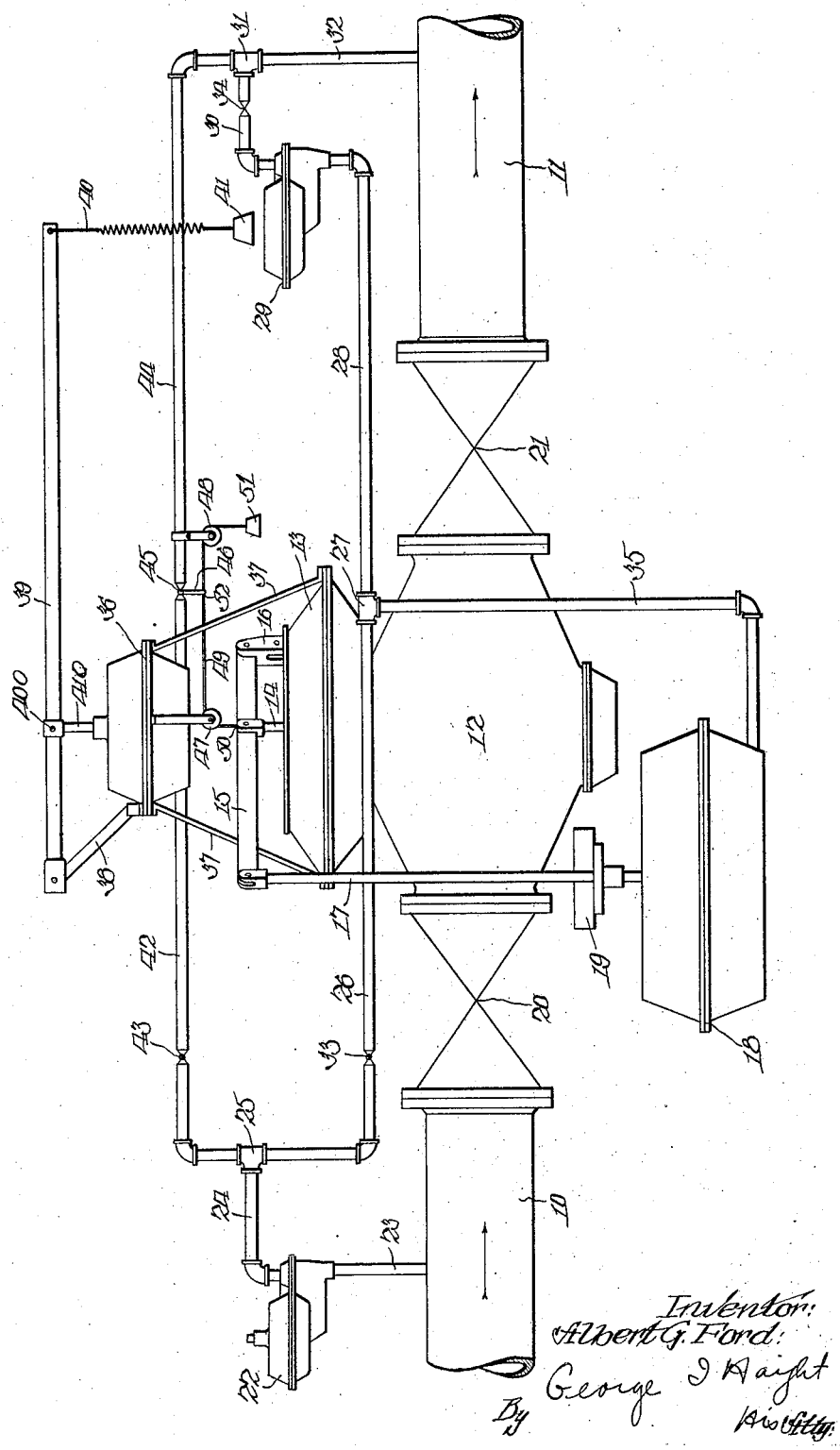
Inventor:
Albert G. Ford
By George I. Haight
His Atty.

Patented June 16, 1931

1,809,930

UNITED STATES PATENT OFFICE

ALBERT G. FORD, OF AURORA, ILLINOIS, ASSIGNOR, BY MESNE ASSIGNMENTS, TO REYNOLDS GAS REGULATOR CO., OF ANDERSON, INDIANA, A CORPORATION OF INDIANA

AUTOMATIC GAS GOVERNOR LOADER

Application filed December 16, 1926. Serial No. 155,325.

This invention relates to improvements in automatic gas governor loader.

In the distribution of gas, one system frequently employed is to lay out the city or area to which the gas is supplied into a number of units or districts. The gas is supplied under relatively high pressure to a central point in each district, such pressure ranging from 5 to 60 pounds per square inch. At the central distributing point of the district or unit, it is customary to employ a so-called district governor or regulator for reducing the pressure of the gas and delivering it into the service mains at a relatively low pressure, as for instance, a pressure equivalent to about 7 to 8 inches of water column. With such district governors or regulators employed in connection with systems of the type indicated, the governor or regulator is so set as to maintain the said pressure of about 7 to 8 inches water column in the service mains at all times, said predetermined pressure in the service mains being such as to meet the maximum or peak loads that will be required during each day. As the load comes on, the governor is automatically regulated so as to permit the passage of the necessary greater quantity of gas while at the same time maintaining said predetermined pressure in the service mains.

As is well known to those in the industry, there are three peak loads daily which total only a relatively small part of the 24 hours, such peak loads occurring early in the morning beginning at approximately 6:30 a. m. in the average city and lasting for approximately two hours; again at the noon time beginning approximately at 11 o'clock and lasting for approximately one and a half hours; and again in the evening beginning at some time a little after 4 p. m. and lasting until 6:30 or 7 p. m. During the remainder of the 24 hours, there is only a comparatively light load, which does not require the maximum pressure in the service main that is required to take care of the peak loads. As is also well known to those skilled in the art, one of the greatest sources of loss to gas companies is the leakage which occurs in the service mains, such leakage amounting to a relatively high percentage of the total gas pumped into the mains. The higher the pressure maintained in the service mains, obviously the greater the amount of leakage and consequently loss to the gas companies.

One of the objects of my invention is to provide an arrangement, particularly but not necessarily, adapted for use in connection with district governors, which will automatically change the setting of the pressure maintained in the service mains so as to permit of the necessary higher pressure therein during peak loads, but which will permit retaining a much lesser pressure in the service mains during the remaining portion of the day when the load is comparatively light to the end that the losses from leakage may be very materially lessened and a much more efficient operation of the distributing system obtained.

More specifically, an object of my invention is to provide an arrangement which will automatically load what is known as the low pressure auxiliary governor whenever a heavy load comes on so as to change the setting of said low pressure auxiliary governor to a somewhat higher pressure, said means being automatically responsive to the operation of the main governor proper, the latter being automatic in its operation and responsive to the load on the system.

Other objects of the invention will more clearly appear from the description and claims hereinafter following.

In the drawing forming a part of this specification, I have illustrated my improvement as applied in connection with one well known type of district governor or regulator, said drawing illustrating the various parts and connections diagrammatically, the drawing being substantially an elevational view.

In said drawing, 10 indicates the main supply high pressure line in which the gas is supplied at any relatively high pressure as, for instance, within the range of 5 to 60 pounds. The pipe 11 is the delivery or discharge pipe from the governor and from which the gas is supplied to the service mains of the district or unit at relatively low pressure. The governor or regulator proper, illustrated in the drawing comprises what may be termed the main governor 12 provided on the top thereof with a main governor bowl 13 in which is disposed the main governor diaphragm. Said diaphragm, as customary, is connected to a center stem 14, said stem also having connected thereto, balanced valves within the said main member 12. The stem 14 is pivotally connected to a lever 15, intermediate the ends of the latter, said lever 15 being pivoted at one end to the fixed bracket 16 and at its opposite end having pivotally connected thereto, a connecting rod 17, which enters a main pressure bowl 18 having within it, as customary, a diaphragm operatively connected to the lower end of said rod 17. The rod 17 may be adjustably weighted as indicated by the weight 19. 20 and 21 indicate conventionally the main gate valves for controlling the admission and delivery of gas to the main governor proper.

On the high pressure side of the governor, is disposed a high pressure auxiliary governor 22 which is connected to the high pressure main 10 by pipe 23 and also has a delivery pipe 24 entering a T 25. From the T 25 runs suitable piping 26 to a T 27 and from the latter, other piping 28, which is in communication with a low pressure auxiliary governor 29. From the latter extends a pipe 30 to a T 31 and from the latter extends a pipe 32 in communication with the low pressure main 11. Included in the piping 26 between the high pressure auxiliary governor 22 and the T 27 is a needle valve indicated conventionally at 33, said needle valve being substantially but not quite entirely closed so as to permit a very slight leakage of gas therethrough. A gate valve is indicated conventionally at 34 which is included in the pipe 30 between the low pressure governor 29 and T 31. From the T 27 extends a pipe 35 leading to the main pressure bowl 18 on the underside of the usual diaphragm therein. The interior parts of the main governor proper 12, bowls 13 and 18 and auxiliary governors 22 and 29 are not deemed necessary of illustration since their constructions and operations are well known to those skilled in the art. All of the parts so far described and their arrangement and operation as a district governor regulator are also well known to those skilled in the art. In practice, it is customary in the type of distributing system hereinbefore referred to, to so set the high pressure auxiliary governor 22 as to have the pressure of the gas delivered therefrom into the pipe 24, to a pressure of approximately one-half pound or, roughly, 14 inches water column. Heretofore, it has been customary to set the low pressure auxiliary governor 29 so as to reduce the pressure of the gas passing therethrough to correspond with such low pressure in the service mains as necessary to meet the peak loads, an average setting heretofore resulting in maintenance of approximately 6.7 or 8 inches water column in the low pressure main 11.

Briefly described, the operation of the district governor so far referred to, is as follows. As load comes on the low pressure main 11, the pressure in the line 28 acting through the governor 29 drops and due to the fact that the needle valve 33 is practically closed, sufficient gas cannot pass the needle valve to maintain the pressure within the pipe line 26—28 and consequently there is a lowering of the pressure in the line 35 which permits the diaphragm of the main pressure bowl 18 to lower, which in turn, lowers the connecting rod 17 and through the lever 15 depresses the connecting rod 14 with the result that the balance valves within the main governor proper are correspondingly opened to permit a greater flow of gas to meet the load. As the load of the low pressure main 11 is taken off, the pressure correspondingly builds up in the pipe line 26—28 and in the line 25, causing a gradual increase of pressure in the bowl 18 which, in turn, elevates the diaphragm thereof and through the connecting rod 17, lever 15 and connecting rod 14, the balance valves of the governor proper are brought back to their original setting. The operation of the governor or regulator is automatic as will be obvious.

Heretofore, it has been customary to set the low pressure auxiliary governor 29 so as to maintain approximately 6, 7 or 8 inches water pressure in the low pressure main 11 at all times during the twenty-four hour period. My improvements permit the normal setting of the low pressure auxiliary governor 29 to a much lesser low pressure for all of those periods during the 24 hours when there is no heavy demand on the low pressure main and to automatically increase the effective setting of said governor 29 to a high pressure when peak or heavy loads come on. This I accomplish by the following simple arrangement.

Conveniently disposed with respect to the main governor 12 and preferably above it, I mount an auxiliary pressure bowl 36, the same being carried by suitable standards 37—37. Fixed to the bowl 36 is a supporting arm 38 to which is pivoted a lever 39, the latter having pivotally connected thereto, at the point 400, a connecting rod 410 which extends into said bowl 36 and is actuated by the usual diaphragm thereof. At its free end, the lever 39 has attached thereto a depending spring 40 to the lower end of which is attached a loading weight 41 normally disposed slightly above and spaced from the upper face of the low pressure auxiliary governor 29. From the T 25 is extended suitable piping 42, communicating with the bottom of the bowl 36, said piping 42 having included therein a needle valve 43 which, like the needle valve 33, is so set as to be almost, but not quite entirely closed, to thereby permit a slight leakage of gas therethrough to the bottom of the bowl 36. Leading from the bottom of the bowl 36 is another pipe line 44 which attaches to the T 31 and hence is in communication with the low pressure main 11. Included in the pipe line 44 and preferably adjacent the bowl 36 is another needle valve 45 having a lever handle 46, said needle valve 45, in normal condition of the parts when no load of consequence is on the system, being entirely closed.

Supported by the bowl 36 and the pipe line 44 in any suitable manner, are idlers 47 and 48 over which runs a cord 49, connected at one end as indicated at 50 to the lever 15 and carrying at its other free end a counterweight 51. Intermediate the idlers, the cord 49 is attached to the needle valve handle 46 as indicated at 52.

With the arrangement just described, it will be observed that normally, the pressure in the bottom of the bowl 36 will correspond to that in the line 24 which is controlled by the high pressure auxiliary governor 22, that is, approximately one-half pound or 14 inches water column, this being permitted due to the slight leakage through the needle valve 43 and the closed needle valve 45. Under this condition, the lever 39 will be maintained in its elevated position and the weight 41 kept free from the low pressure auxiliary governor 29. When the main governor or regulator proper is operated, as previously described, the lever 15 thereof will be depressed. This movement pulls the cord 49 which, in turn, operates the needle valve 45 so as to open the latter and hence place the bottom of the bowl 36 in communication with the piping 44 and 32. As the pressure falls in said piping 44—32 due to the load coming on the low pressure main 11, the pressure cannot build up fast enough in the bowl 36 through the needle valve 43 and consequently there is a lowering of the lever 39 permitting the loading weight 41 to come onto the top of the low pressure governor 29 and hence weight the latter and change its effective setting. Due to the employment of the spring 40, the loading of the auxiliary governor 29 will be gradual, that is, the effect of the total weight of the weight member 41 will not be applied at once, but will be gradully applied, as will be understood. As the load on the low pressure main 11 falls, the governor or regulator proper will gradually come back to its normal setting, thereby permitting the counterweight 51 to pull the cord 49 to the right as viewed in the drawing and again close the needle valve 49. With the latter closed, the pressure in the bottom of the bowl 36 gradually builds up, thus elevating the diaphragm therein and in turn causing elevation of the lever 39 and lifting of the weight 49 from the auxiliary pressure governor 29.

With the arrangement described, it is evident that the auxiliary low pressure governor 29 can be normally set for such minimum load pressure in the service mains as will meet the light loads required during the greater part of the day and that, when heavy or peak loads come on, the effective setting of said auxiliary governor 29 can be immediately increased to such higher low pressure as will fulfill the pressure demands during such relatively short intervals during the day. It is obvious that the range between the normal setting and the automatically increased effective setting of the auxiliary governor 29 can be varied as desired by changing the loading weight 41 and the initial setting of the auxiliary governor 29. In actual practice, very efficient results have been obtained by having an initial or normal setting of the auxiliary governor 29 so as to maintain approximately 4.2 or 4.4 inches of water column with an automatic loading to bring the effective pressure up to 6.4 or 6.6 inches of water column during the peak or maximum loads.

From the foregoing description, it will be seen that the improvements which I have designed are comparatively inexpensive; may be readily applied to district governors now in service without modification of the latter; and permit of a much more efficient distribution of the gas within a district and particularly in the lessening of leakages.

Although I have herein shown and described what I now consider the preferred manner of carrying out my invention, the same is merely illustrative and I contemplate all changes and modifications that come within the scope of the claims appended hereto.

I claim:

1. In a device of the character described, the combination with automatically operating governor means for a gas distributing system having low pressure on the delivery side and high pressure on the supply side, said means including therein a main governor and a low pressure auxiliary governor normally set for a predetermined pressure; of auxiliary pressure means responsive, automatically controlled by said governor means, when under load, for loading said low pressure auxiliary governor to effect a higher pressure setting thereof than that for which it is normally set.

2. In a device of the character described, the combination with automatic governor means for a gas distributing system having low pressure on the outlet side and higher pressure on the supply side, said means including therein a main governor and a low pressure auxiliary governor set for a predeterminal pressure; of pressure operable means in communication with the pressure developed by said system and for applying a predetermined maximum load to said low pressure auxiliary governor to effect a higher pressure setting than that for which normally set, and means actuated by said governor means when under load for controlling said pressure operable means.

3. In a device of the character described, the combination with automatic governor means for a gas distributing system having low pressure on the outlet side and higher pressure on the supply side, said means including therein a low pressure auxiliary governor normally set for a predetermined pressure; of pressure responsive means, including a resilient element, automatically operative upon actuation of said governor means when under load, for applying a graduated load to said auxiliary governor to thereby effect a higher pressure setting thereof than that for which normally set.

4. In a device of the character described, the combination with a gas district governor means including a main governing device and a low pressure auxiliary governor device normally set for a relatively low, predetermined pressure on the delivery side of said means; of means normally maintained ineffective for automatically changing the effective setting of said auxiliary governor device to produce an increased low pressure on said delivery side, said means being in the form of an additional pressure operated device and including actuating members responsive to actuation of said governing means.

5. In a device of the character described, the combination with a gas district governor means including a main pressure-regulating governing device and a low pressure auxiliary governor device normally set for a relatively low, predetermined pressure on the delivery side of said means; of means actuated by an increased load on the delivery side for automatically changing the effective setting of said auxiliary governor device to produce an increased low pressure on said delivery side, and including a weight adapted when moved to its loading position to load such auxiliary governor device, and a controller actuated by said governing means when the latter is actuated for controlling said increased load actuated means.

6. In a device of the character described, the combination with a gas district governing means including a main pressure-regulating governing member and a low pressure auxiliary governor device normally set for a relatively low, predetermined pressure on the delivery side of said means; of additional pressure operable means, normally responsive to pressure on the high pressure side of said means and thereby maintained ineffective, and means responsive to actuation of said governing means for rendering said additional pressure operable means responsive to pressure on said delivery side to automatically change the effective setting of said auxiliary governor device.

7. In a gas distributing system, the combination with means therein for reducing the pressure of gas supplied thereto at one side and delivering the gas at the opposite side at a lower pressure; of means, including a device responsive to load on said low pressure side for automatically controlling said first named means to deliver a greater load therethrough; an additional means normally responsive to the pressure of gas at said supply side, and means for rendering said additional means responsive to relatively heavy load on said low pressure side, for temporarily increasing the maintained pressure on said low pressure side while said heavy load continues.

In witness that I claim the foregoing I have hereunto subscribed my name this 30th day of November 1926.

ALBERT G. FORD.